(12) United States Patent
Kane et al.

(10) Patent No.: US 10,616,536 B2
(45) Date of Patent: Apr. 7, 2020

(54) IMAGING SYSTEMS HAVING BROADBAND MONOCHROMATIC AND CHROMATIC IMAGE SENSORS

(71) Applicant: SEMICONDUCTOR COMPONENTS INDUSTRIES, LLC, Phoenix, AZ (US)

(72) Inventors: Paul James Kane, Rochester, NY (US); Robin Brian Jenkin, Morgan Hill, CA (US)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 89 days.

(21) Appl. No.: 15/869,221

(22) Filed: Jan. 12, 2018

(65) Prior Publication Data

US 2019/0222813 A1    Jul. 18, 2019

(51) Int. Cl.
*H04N 5/225*    (2006.01)
*H04N 9/64*    (2006.01)
(Continued)

(52) U.S. Cl.
CPC .......... *H04N 9/097* (2013.01); *H04N 5/2258* (2013.01); *H04N 9/646* (2013.01); *H04N 9/77* (2013.01); *H04N 9/67* (2013.01); *H04N 9/735* (2013.01)

(58) Field of Classification Search
CPC ........ H04N 9/097; H04N 9/646; H04N 9/735; H04N 9/77; H04N 5/2258; H04N 9/67
See application file for complete search history.

(56) References Cited

U.S. PATENT DOCUMENTS 5,018,006 A    5/1991  Hashimoto
5,523,785 A *  6/1996  Muramoto ............. H04N 5/202
                                            348/254
(Continued)

FOREIGN PATENT DOCUMENTS

CN    101080022 A    11/2007
EP       2302900       3/2011
(Continued)

OTHER PUBLICATIONS http://lea.hamradio.si/~s51kq/V-CIV.HTM (Color in Image and Video Jun. 18, 2019).*
(Continued)

*Primary Examiner* — Hung H Lam
(74) *Attorney, Agent, or Firm* — Treyz Law Group, P.C.; David K. Cole

(57) ABSTRACT

An imaging device may have a monochrome image sensor and a bi-chromatic image sensor. A beam splitter may split incident light between the two image sensors. The monochrome image sensor may have an array of broadband image sensor pixels that generate broadband image signals. The bi-chromatic image sensor may have an array of red and blue image pixels that generate red and blue image signals. The image sensors may be coupled to processing circuitry that performs processing operations on only the broadband image signals to produce monochrome images, or on the red, blue, and broadband image signals to produce color images. Processing operations used to produce color images may include chroma-demosaicking and/or point filter operations.

17 Claims, 7 Drawing Sheets

(51) Int. Cl.
*H04N 9/097* (2006.01)
*H04N 9/77* (2006.01)
*H04N 9/67* (2006.01)
*H04N 9/73* (2006.01)

(56) References Cited

U.S. PATENT DOCUMENTS

| | | | |
|---|---|---|---|
| 6,330,029 B1 | 12/2001 | Hamilton et al. | |
| 6,788,338 B1 * | 9/2004 | Dinev | H04N 5/2258 348/222.1 |
| 7,202,891 B1 * | 4/2007 | Ingram | H04N 5/2254 348/224.1 |
| 7,688,368 B2 | 3/2010 | Kijima et al. | |
| 9,191,635 B2 | 11/2015 | Mlinar et al. | |
| 2007/0296835 A1 | 12/2007 | Olsen et al. | |
| 2008/0030611 A1 | 2/2008 | Jenkins | |
| 2008/0068477 A1 | 3/2008 | Iida et al. | |
| 2008/0124000 A1 | 5/2008 | Sato et al. | |
| 2009/0160992 A1 | 6/2009 | Inaba et al. | |
| 2010/0232692 A1 | 9/2010 | Kumar et al. | |
| 2010/0302423 A1 | 12/2010 | Adams, Jr. et al. | |
| 2011/0187902 A1 | 8/2011 | Adams, Jr. et al. | |
| 2011/0188748 A1 | 8/2011 | Adams, Jr. et al. | |
| 2012/0162465 A1 | 6/2012 | Culbert et al. | |
| 2013/0242148 A1 * | 9/2013 | Mlinar | H04N 9/045 348/279 |

FOREIGN PATENT DOCUMENTS

| | | |
|---|---|---|
| JP | H06339145 | 12/1994 |
| JP | 2007520166 | 7/2007 |
| JP | 2007288395 | 11/2007 |
| JP | 2008078922 | 4/2008 |
| JP | 2008187249 | 8/2008 |
| JP | 2009005262 | 1/2009 |
| JP | 2009153013 | 7/2009 |
| JP | 2010509841 | 3/2010 |
| JP | 2011055038 | 3/2011 |

OTHER PUBLICATIONS https://people.cs.pitt.edu/~mehmud/cs134-2084/exercise/c4_el.html (Color Wavelenght Interval Jun. 19, 2019).*
https://physics.info/color/ (Glenn Elert 1998-2019).*

* cited by examiner

IMAGING SYSTEMS HAVING BROADBAND MONOCHROMATIC AND CHROMATIC IMAGE SENSORS

BACKGROUND

This relates generally to imaging devices, and more particularly, to imaging devices with multiple image sensors.

Image sensors are commonly used in electronic devices such as cellular telephones, cameras, and computers to capture images. In a typical arrangement, an electronic device is provided with an image sensor having an array of image pixels arranged in pixel rows and pixel columns. Circuitry is commonly coupled to each pixel column for reading out image signals from the image pixels.

Conventional imaging systems employ a single image sensor in which the visible light spectrum is sampled by red, green, and blue (RGB) image pixels arranged in a Bayer mosaic pattern. The Bayer mosaic pattern consists of a repeating cell of two-by-two image pixels, with two green pixels diagonally opposite one another, and the other corners being red and blue. Imaging systems that employ the Bayer mosaic pattern have limited sensitivity and spatial resolution.

It would therefore be desirable to be able to provide imaging devices with improved image capture and processing capabilities.

DETAILED DESCRIPTION

Electronic devices such as digital cameras, computers, cellular telephones, video cameras, security cameras, and other electronic devices include image sensors that gather incoming light to capture an image. The image sensors may include arrays of image pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the image pixels and readout circuitry for reading out image signals corresponding to the electric charge generated by the photosensitive elements. Readout circuitry may include selectable readout circuitry coupled to each column of pixels that can be enabled or disabled to reduce power consumption in the device and improve pixel readout operations.

Figure 1:
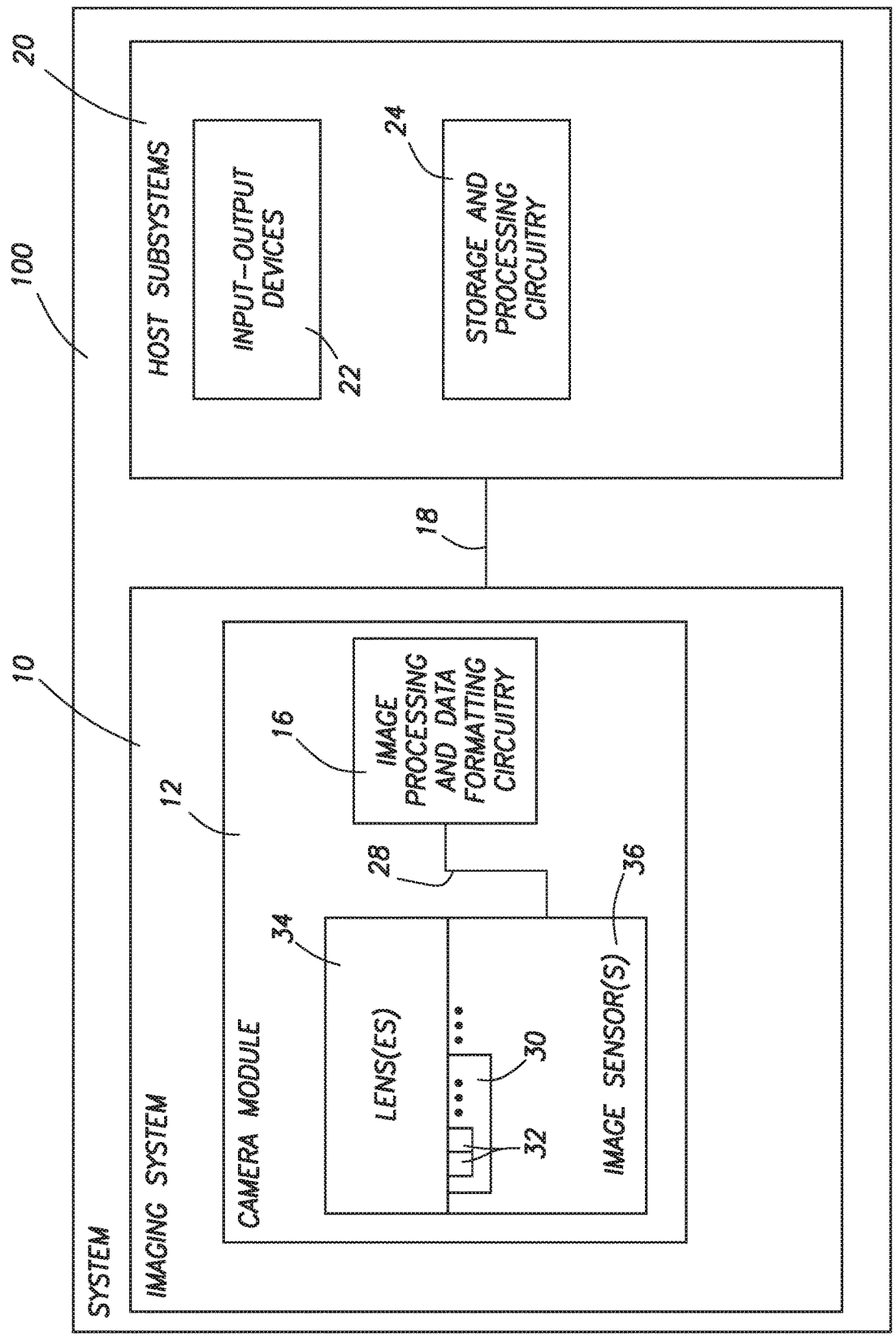
FIG. 1 is a diagram of an illustrative electronic device having an imaging system in accordance with an embodiment.

FIG. 1 is a diagram of an illustrative imaging and response system including an imaging system that uses image sensors to capture images. System 100 of FIG. 1 may be an electronic device such as a camera, a cellular telephone, a video camera, or other electronic device that captures digital image data, may be a vehicle safety system (e.g., an active braking system or other vehicle safety system), or may be a surveillance system, as examples.

As shown in FIG. 1, system 100 may include an imaging system such as imaging system 10 and host subsystems such as host subsystem 20. Imaging system 10 may include camera module 12. Camera module 12 may include one or more image sensors 36 and one or more lenses 34.

Each image sensor in camera module 12 may be identical or there may be different types of image sensors in a given image sensor array integrated circuit. During image capture operations, each lens 34 may focus light onto an associated image sensor 36 or each lens 34 may focus light onto multiple image sensors 36. Image sensors 36 may each include one or more arrays 30 of photosensitive elements (i.e., pixels 32) that convert the light into digital data. Image sensors may have any number of pixels (e.g., hundreds, thousands, millions, or more). Pixels 32 may sometimes be referred to herein as image pixels 32 or image sensor pixels 32. A typical image sensor may, for example, have millions of pixels (e.g., megapixels). Image pixels 32 may be formed in a semiconductor substrate using complementary metal-oxide-semiconductor (CMOS) technology or charge-coupled device (CCD) technology or any other suitable photosensitive devices. Image pixels 32 may be frontside illumination (FSI) image pixels or backside illumination (BSI) image pixels.

Still and video image data from image sensors 36 may be provided to image processing and data formatting circuitry 16 via path 28. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip (SOC) arrangement, camera sensor 36 and image processing and data formatting circuitry 16 are implemented on a common semiconductor substrate (e.g., a common silicon image sensor integrated circuit die). If desired, camera sensor 36 and image processing circuitry 16 may be formed on separate semiconductor substrates. For example, camera sensor 36 and image processing circuitry 16 may be formed on separate substrates that have been stacked.

Imaging system 10 (e.g., image processing and data formatting circuitry 16) may convey acquired image data to host subsystem 20 over path 18. Host subsystem 20 may include processing software for detecting objects in images, detecting motion of objects between image frames, determining distances to objects in images, filtering or otherwise processing images provided by imaging system 10.

If desired, system 100 may provide a user with numerous high-level functions. In a computer or advanced cellular telephone, for example, a user may be provided with the ability to run user applications. To implement these functions, host subsystem 20 of system 100 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid-state drives, etc.). Storage and processing circuitry 24 may also include microprocessors, microcontrollers, digital signal processors, application specific integrated circuits, etc.

Figure 2:
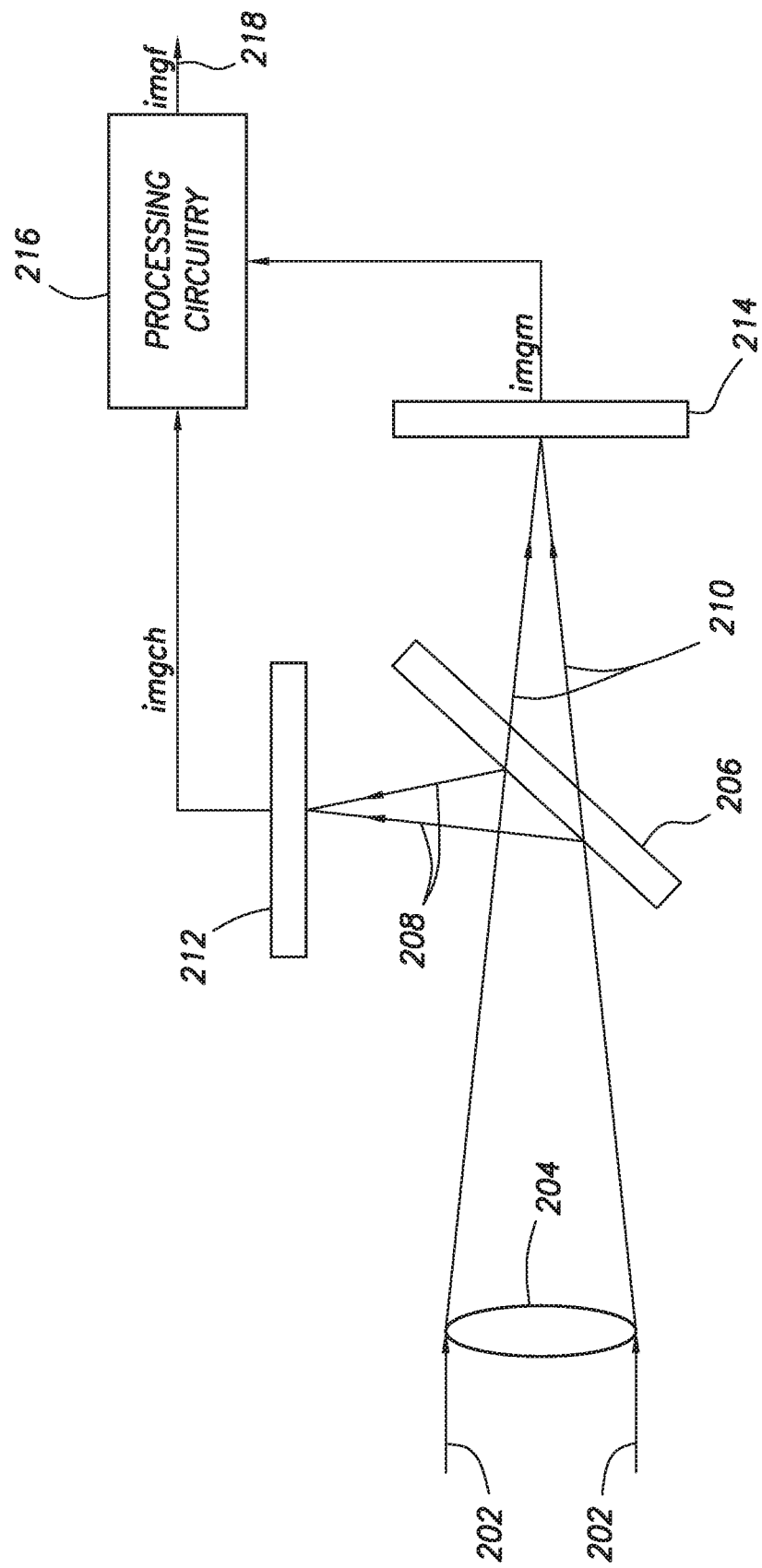
FIG. 2 is a diagram of an illustrative camera module having both a broadband monochromatic image sensor and a bi-chromatic image sensor in accordance with an embodiment.

If desired, more than one image sensor may be used in a single camera module to allow the camera module to vary the spatial and spectral resolution of output images. An illustrative camera module having two image sensors is shown in FIG. 2. As shown in FIG. 2, incident light 202 may pass through lens 204, directing the light towards beam splitter 206. Beam splitter 206 may split incident light 202 into first light portion 208 and second light portion 210. Bi-chromatic image sensor 212 (sometimes referred to herein as a chroma image sensor, chromatic image sensor, di-chromatic image sensor, bi-chrome image sensor, di-chrome image sensor, or color image sensor) may receive first light portion 208 from beam splitter 206 and may output corresponding bi-chromatic image data imgch (sometimes referred to as chroma image data, chromatic image data, di-chromatic image data, di-chrome image data, di-chrome image data, RB image data, or colored image data) to processing circuitry 216. Monochrome image sensor 214 (sometimes referred to herein as a luminance image sensor, luma image sensor, broadband image sensor, monochromatic image sensor, broadband monochromatic image sensor, or broadband monochrome image sensor) may receive second light portion 210 from beam splitter 206 and may output corresponding monochrome image data imgm (sometimes referred to herein as monochromatic image data, luma image data, luminance image data, clear image data, or white image data) to processing circuitry 216. Processing circuitry 216 may have an output 218 and may output a final image imgf on output 218. If desired, final image imgf may be further processed by host processor 24 or other processing circuitry in system 100.

The amount of light sent to bi-chromatic image sensor 212 and to monochrome image sensor 214 (e.g., first light portion 208 and second light portion 210, respectively), may be controlled by beam splitter 206. For example, beam splitter 206 may be configured to send half of the light to each sensor, 60% of the light to monochrome image sensor 214 and 40% of the light to bi-chromatic image sensor 212, 70% of the light to monochrome image sensor 214 and 30% of the light to bi-chromatic image sensor 212, or more than 70% of the light to monochrome image sensor 214 and less than 30% of the light to bi-chromatic image sensor 212. However, these proportions are merely illustrative. Beam splitter 206 may be configured to split the light between first light portion 208 and second light portion 210 in any desired proportions. If desired, beam splitter 206 may be spectrally neutral, allowing light to pass through the beam splitter independent of its wavelength and maintaining the color of the light as it passes through beam splitter 206. In some embodiments, beam splitter 206 may be dichroic, such that first light portion 208 may have a different spectrum than second light portion 210. In some embodiments, beam splitter 206 may polarize the light incident on beam splitter 206 such that first light portion 208 may be polarized in a first direction and second light portion 210 may be polarized in a second direction.

Figure 3:
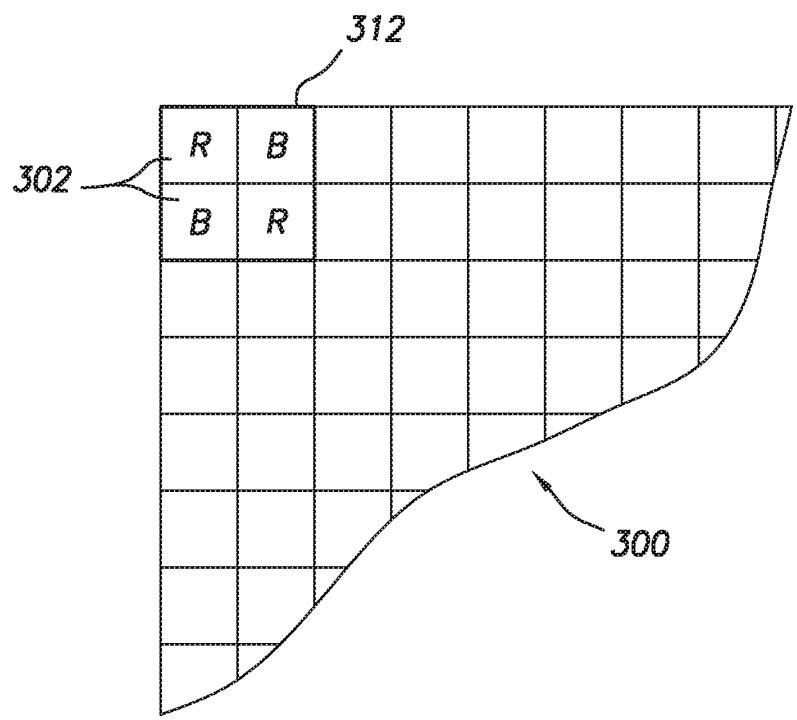
FIG. 3 is an illustrative pixel unit cell having red and blue filter pixels in accordance with an embodiment.

Chroma image sensor 212 and monochrome image sensor 214 may each include a respective pixel array, such as pixel arrays 30 of FIG. 1. The pixel arrays 30 in chroma image sensor 212 and monochrome image sensor 214 may each be provided with a corresponding array of color filters (sometimes referred to herein as a color filter array or an array of color filter elements). As an example, FIG. 3 shows a color filter array 300 that may be incorporated into chroma image sensor 212. As shown in FIG. 3, color filter array 300 contains repeating patterns of color filter elements 302. Each color filter element may overlap with a corresponding pixel 32 in the underlying array 30 (e.g., each color filter element may pass light of a corresponding color to the underlying photodiode).

Color filter arrays generally allow a single image sensor to sample red, green, and blue (RGB) light using corresponding red, green, and blue image sensor pixels arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. Although the Bayer mosaic pattern is effective in capturing RGB signals and therefore has effective spectral resolution, the pattern can inhibit spatial resolution of the final image. It may therefore be desirable to be able to provide image sensors with an improved means of capturing images.

In one suitable example, image pixels may have blue and red image filter elements 302, as shown in FIG. 3. These blue and red filter elements may respectively overlap blue and red image pixels in the underlying array. As illustrated in FIG. 3, a unit cell 312 of color filters 302 may be formed from two red (R) color filters that are diagonally opposite one another and two blue (B) color filters that are diagonally opposite one another. Unit cell 312 may be repeated across color filter array 300 to form a mosaic of red and blue color filters 302. Red image pixels (e.g., pixels overlapped by red color filters) may generate red image signals in response to red light and blue image pixels (e.g., pixels overlapped by blue color filters) may generate blue image signals in response to blue light.

The unit cell 312 of FIG. 3 is merely illustrative. If desired, any color filter elements may be used in unit cell 312. For example, a unit cell 312 may be defined by two red filter elements that are formed diagonally opposite one another and two green filter elements that are formed diagonally opposite one another. In another suitable arrangement, a unit cell 312 may be defined by two blue filter elements that are formed diagonally opposite one another and two green filter elements that are formed diagonally opposite one another. However, this is merely illustrative. Unit cell 312 may include any desired filter elements, such as cyan filter elements, magenta filter elements, yellow filter elements, infrared (IR) filter elements, or ultraviolet (UV) filter elements. These filter elements may respectively overlap and correspond to cyan image pixels, magenta image pixels, yellow image pixels, infrared (IR) image pixels, or ultraviolet (UV) image pixels. If desired, some image pixels may not include color filter elements. Image pixels that do not include color filter elements and image pixels that are provided with clear color filter elements may sometimes be referred to as clear pixels, white pixels, clear image pixels, or white image pixels. If desired, a unit cell 312 may be defined by two elements of one color that are formed horizontally or vertically adjacent to each other, and two elements of a second color that are also formed horizontally or vertically adjacent to each other. The elements may align with elements in adjacent unit cells to form vertical or horizontal stripe patterns, or may be offset from elements in adjacent unit cells to form a checkerboard pattern.

Figure 4:
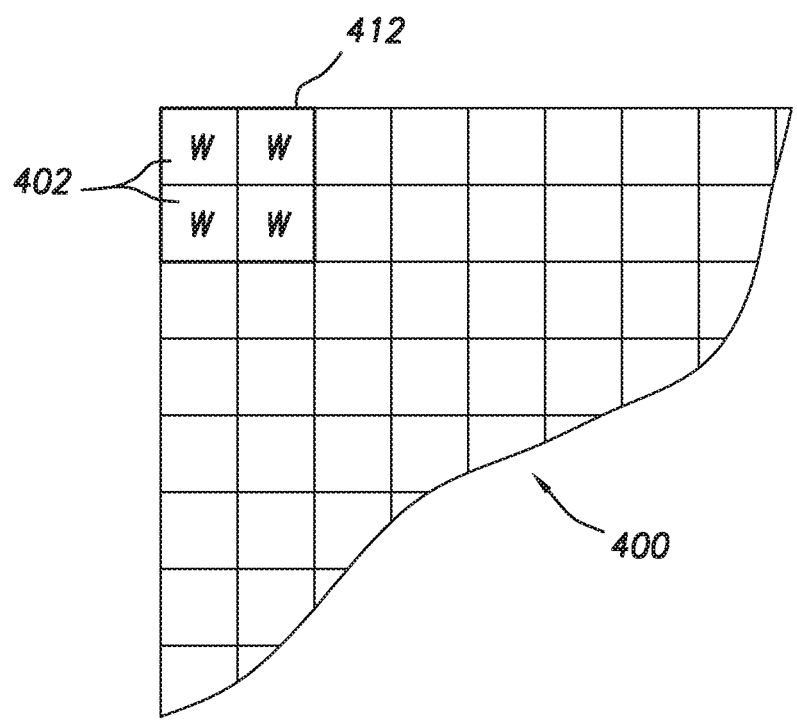
FIG. 4 is an illustrative pixel unit cell having broadband filter pixels in accordance with an embodiment.

FIG. 4 shows an example of a color filter array 400 that may be incorporated into monochrome image sensor 214. As shown in FIG. 4, filter array 400 contains filter elements 402. Each filter element may overlap and correspond to one of the pixels 32 in the underlying pixel array 30.

As shown in FIG. 4, filter array 400 may include broadband filters 402 that overlap with broadband image pixels (sometimes referred to herein as white (W) image pixels or clear image pixels) of the pixel array 30 in monochrome image sensor 214. Broadband filters 402 in unit cell 412 may be formed with a visibly transparent color filter that transmits light across the visible light spectrum (e.g., broadband filters 402 may pass white light to the underlying broadband pixels). However, broadband filters 402 are not limited to filters that pass white light. Filter elements that pass two or more colors of light (e.g., two or more colors of light selected from the group that includes red light, blue light, and green light) are sometimes referred to herein as "broadband" filter elements. For example, yellow color filter elements that are configured to pass red and green light and clear color filter elements that are configured to pass red, green, and blue light may be referred to herein as broadband filter elements or broadband color filter elements. Similarly, image pixels that include a broadband color filter element (e.g., a yellow or clear color filter element) and that are therefore sensitive to two or more colors of light (e.g., two or more colors of light selected from the group that includes red light, blue light, and green light) may sometimes be referred to herein as broadband pixels or broadband image pixels. In contrast, "colored" pixel may be used herein to refer to image pixels that are primarily sensitive to one color of light (e.g., red light, blue light, green light, or light of any other suitable color).

Broadband filters 402 may have a natural sensitivity defined by the material that forms the transparent color filter and/or the material that forms the image sensor pixel (e.g., silicon). The sensitivity of the broadband image pixels may, if desired, be adjusted for better color reproduction and/or noise characteristics through use of light absorbers such as pigments in broadband filters 402.

Although filter array 400 is illustrated as having only broadband filters 402 in FIG. 4, filter array 400 may have filters of any color (e.g., including broadband filters). For example, filter array 400 may include yellow filters, infrared (IR) filters, or ultraviolet (UV) filters that may respectively correspond to yellow image pixels, infrared image pixels, or ultraviolet image pixels. In general, any broadband filters and corresponding broadband image pixels (e.g., image pixels responsive to light of more than two colors) may be used. This allows monochrome image sensor 214 to produce image signals with higher spatial resolution than the image signals produced by bi-chromatic image sensor 212 (e.g., because the image signals generated by sensor 214 need not be demosaicked to extract image signals for any missing pixel locations since all of the pixels in sensor 214 have the same type of color filter element).

Figure 5:
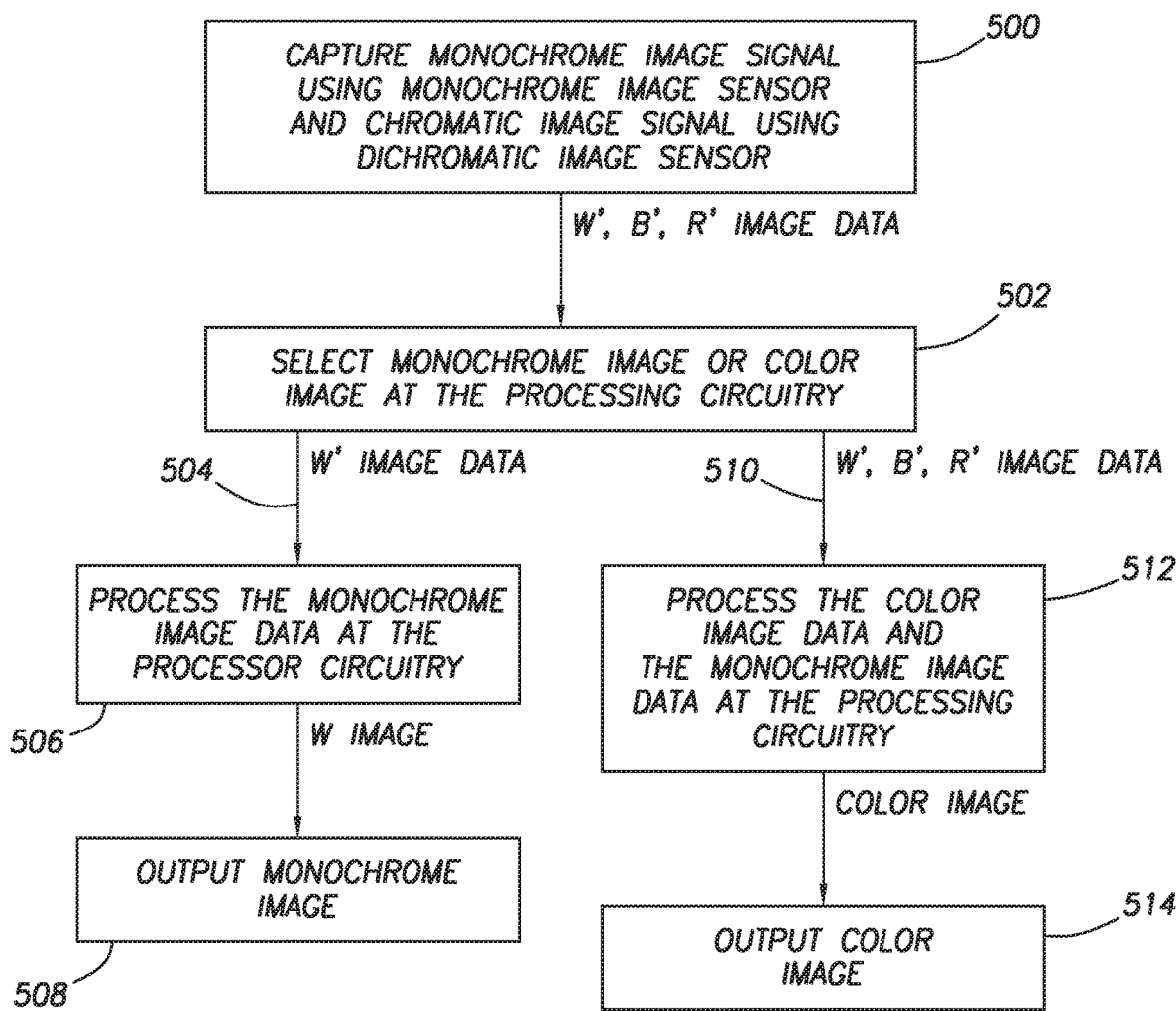
FIG. 5 is a flow chart of illustrative steps that may be performed by an imaging system of the type shown in FIGS. 1-4 to generate a monochrome or color image in accordance with an embodiment.

FIG. 5 shows a flow chart of illustrative steps that may be performed by processing circuitry such as processing circuitry 16 and host processing circuitry 24 of FIG. 1 to process image signals gathered by filtered pixel arrays in image sensors 214 and 212. The steps of FIG. 5 may, for example, be performed by processing circuitry 16 and host processing circuitry 24 to reduce noise in image signals.

At step 500, image sensors 212 and 214 (FIG. 2) may capture image signals from a scene. The image signals captured by image sensor 214 may include monochrome image signals generated in response to light gathered with broadband image pixels whereas the image signals captured by sensor 212 may include chroma image signals generated in response to light gathered using two different sets of colored image pixels. The image signals may be converted into corresponding digital image data. For example, monochrome image sensor 214 may capture broadband (W') image data whereas chroma image sensor 212 may capture red (R') and blue (B') image data (e.g., using a filter arrangement of the type shown in FIG. 3). This is merely illustrative and, in general, the image data gathered by chroma sensor 212 may include any desired colors (e.g., having lower spectral response values than that of the broadband signals generated by monochrome sensor 214). In one example, the image signals (image data) generated by the first set of image pixels in sensor 212 (e.g., red image signals generated by red pixels) may have a first spectral response value (an integrated signal power level as a function of the frequency of light received by the first set of image pixels), the image signals (image data) generated by the second set of image pixels in sensor 212 (e.g., blue image signals generated by blue pixels) may have a second spectral response value, and the broadband image signals (image data) may have a third spectral response value that is, for example, a wider spectral response than the first image signals (e.g., a wider spectral response than a sum of the first and second spectral response values). In another example, the third spectral response value may be greater than seventy five percent of a sum of the first and second spectral response values (e.g., broadband image signals having a broad sensitivity for an equal energy radiator over the visible light spectrum with standard CIE illuminant E). The image signals may have image values (pixel values) corresponding to the amount of light captured by each image pixel (e.g., red image signals may include red image values, blue image signals may include blue image values, broadband image signals may include broad band image values, etc.). Image sensors 212 and 214 may produce image data based on the collected image signals (e.g., after converting analog image signals to digital image data), and the image data may be conveyed to processing circuitry 16 for image processing. For example, chromatic image data imgch of FIG. 2 may include the red (R') and blue (B') image data of FIG. 5 whereas monochrome image data imgm of FIG. 2 may include the broadband (W') image data of FIG. 5.

At step 502, processing circuitry 16 may select whether a monochrome image or a color image is desired as an output. This selection may be determined by processing circuitry 16 automatically based on the application of the image sensor, or may be selected by a user of the image sensor.

If a monochrome image is desired, the imaging system may proceed to step 506 as shown by path 504. At step 506, processing circuitry 16 (FIG. 2) may perform any desired processing operations on the broadband image data W' (e.g., contrast adjustment operations, white balance operations, gamma correction operations, brightness adjustment operations, etc.) to generate a corresponding broadband image W. As all of the pixel values in broadband image W are broadband pixel values, broadband image W is also a monochrome image. At step 508, processing circuitry 16 may output the monochrome broadband image W as final image imgf (as shown in FIG. 2). The output monochrome broadband image may be passed to other processing circuitry such as host processing circuitry 24 (FIG. 1), to display equipment, to memory for storage, or elsewhere.

If a color image is desired, processing may proceed to step 512 as shown by path 510. At step 512, processing circuitry 16 may perform processing operations on blue image data B', red image data R', and broadband image data W' to generate a final color image. The final color image may include pixel values generated in response to the W', B', and R' image data. For example, the final color image may include an RGB image or an sRGB image having demosaicked pixel values at all pixel locations that are generated from a combination of the W', B', and/or R' image data. At step 514, processing circuitry 16 may output the color image as final image imgf (as shown in FIG. 2). The output color image may be passed to other processing circuitry such as host processing circuitry 24 (FIG. 1), to display equipment, to memory for storage, or elsewhere.

Figure 6:
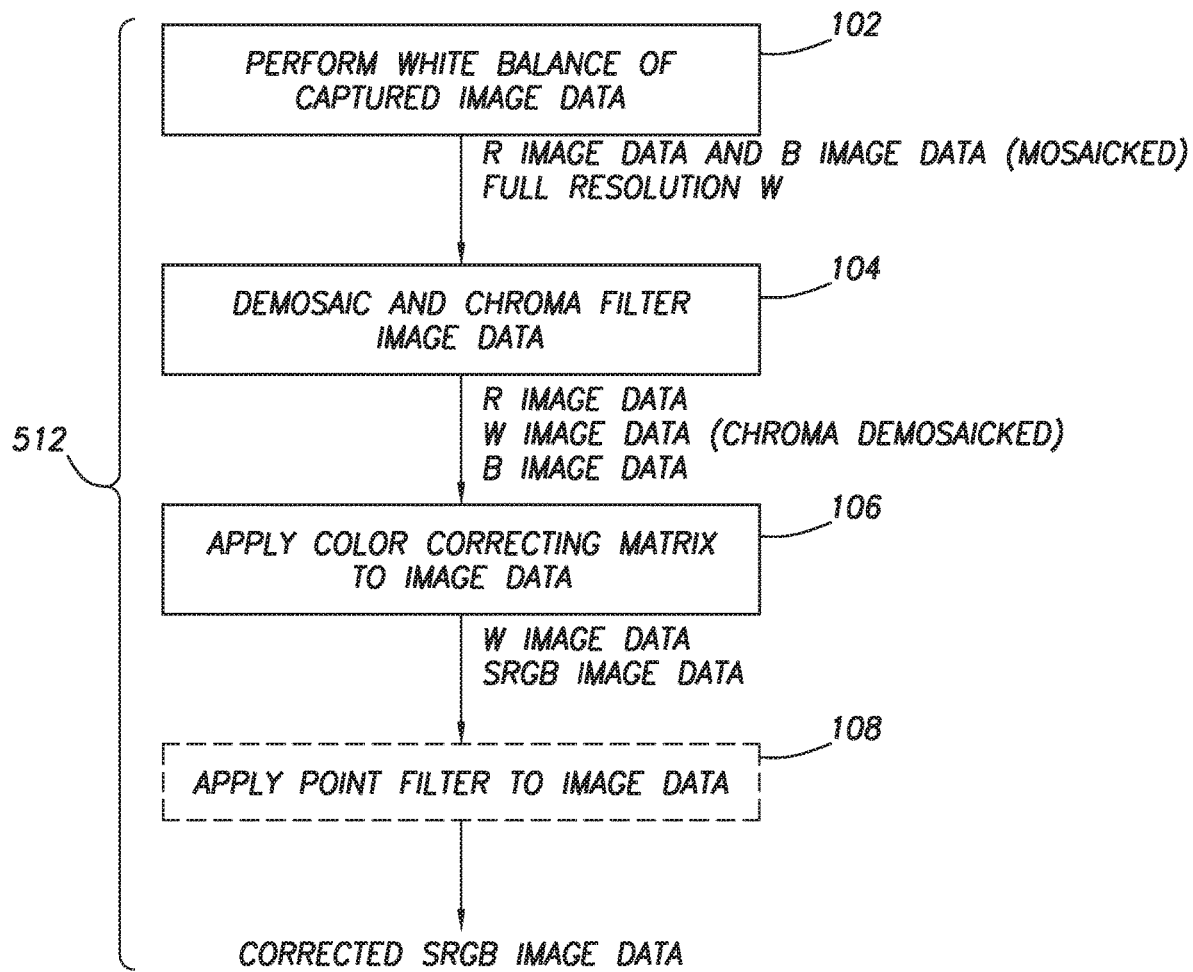
FIG. 6 is a flow chart of illustrative steps that may be performed by processing circuitry in an imaging system to produce a color image in accordance with an embodiment.

FIG. 6 shows a flow chart of illustrative steps that may be performed by processing circuitry such as processing circuitry 16 of FIG. 2 to process the broadband image data produced by monochrome image sensor 214 and the chromatic image data produced by bi-chromatic image sensor 212 to generate a final color image. The steps of FIG. 6 may, for example, be performed while processing step 512 of FIG. 5.

At step 102, a white balance operation may be performed on the broadband image data, red image data, and blue image data. In the example of FIG. 6, white-balanced red image data (R), white-balanced blue image data (B), as well as full resolution broadband image data (W), may be produced. Full resolution data W may, for example, be twice the resolution of the red and blue image data (e.g., because the broadband image data includes pixel values at each pixel location whereas only half of the pixel values in the chroma image data are red pixel values).

At step 104, processing circuitry 16 may demosaic and apply a chroma filter to the white-balanced image data to extract chroma demosaicked red and blue image data from the white-balanced image data. The chroma filter may be applied to chroma de-noise the white-balanced image data. Processing circuitry 16 may, for example, demosaic the image data and apply the chroma filter simultaneously, sequentially, or in an interspersed manner. This process of applying a chroma filter and demosaicking the image data may sometimes be referred to herein as "chroma demosaicking." The chroma filter may increase noise correlation between image data of each color (e.g., noise fluctuations in the red, broadband, and blue channels may increase or decrease together in a correlated manner). For example, processing circuitry 16 may increase the correlated noise between the red, broadband, and blue image data to as much as 70% or more of all noise associated with the red, broadband, and blue image data.

By increasing noise correlation, processing circuitry 16 may reduce the amount of noise amplification generated when a CCM is applied to the image data. Chroma demosaicking the image data may allow missing color image data (e.g., image signals of colors not generated by the image pixels) to be determined from available image data. In this example, green image data may be missing from the gathered image data because no green color filter is used in unit cell 312 (FIG. 3). Green image data may be determined using the broadband, red, and blue image data (e.g., by performing subtraction operations). In general, any of the primary additive colors (e.g., red, green, and blue) may be determined using the available image data. It may be desirable to produce red, green, and blue image data regardless of the color filters used on image pixel array 30 because display systems often display images using red, green, and blue pixels.

At step 106, processing circuitry 16 may apply a color correction matrix (CCM) to the red image data, broadband image data, and blue image data. The CCM may, for example, extract green image data from the broadband image data to generate red, green, and blue image data. For example, the CCM may convert the image data into standard red, standard green, and standard blue image data (sometimes referred to collectively as linear sRGB image data or simply sRGB image data). In another suitable arrangement, the CCM may extract green image data from the red and/or blue image data. If desired, gamma correction processes may be performed on the linear sRGB image data. After gamma correction, the sRGB image data may be used for display using an image display device. In some cases, it may be desirable to provide additional noise reduction (e.g., by applying a point filter to the sRGB image data) to further mitigate the noise amplification generated by applying the CCM to the red, white, and blue image data. Processing circuitry 16 may preserve the broadband image data for further processing of the sRGB image data during optional step 108.

At optional step 108, processing circuitry 16 may apply a point filter to the image data (e.g., to the sRGB image data produced after applying the CCM to the red, white, and blue image data). The point filter may operate on the sRGB image data to generate corrected sRGB data. The point filter may serve to further reduce noise amplification caused by applying the CCM to the red, broadband, and blue image data. When displayed using a display system, the corrected sRGB data thereby provide better image quality (e.g., better luminance performance) when compared to the sRGB data prior to applying the point filter.

Figure 7:
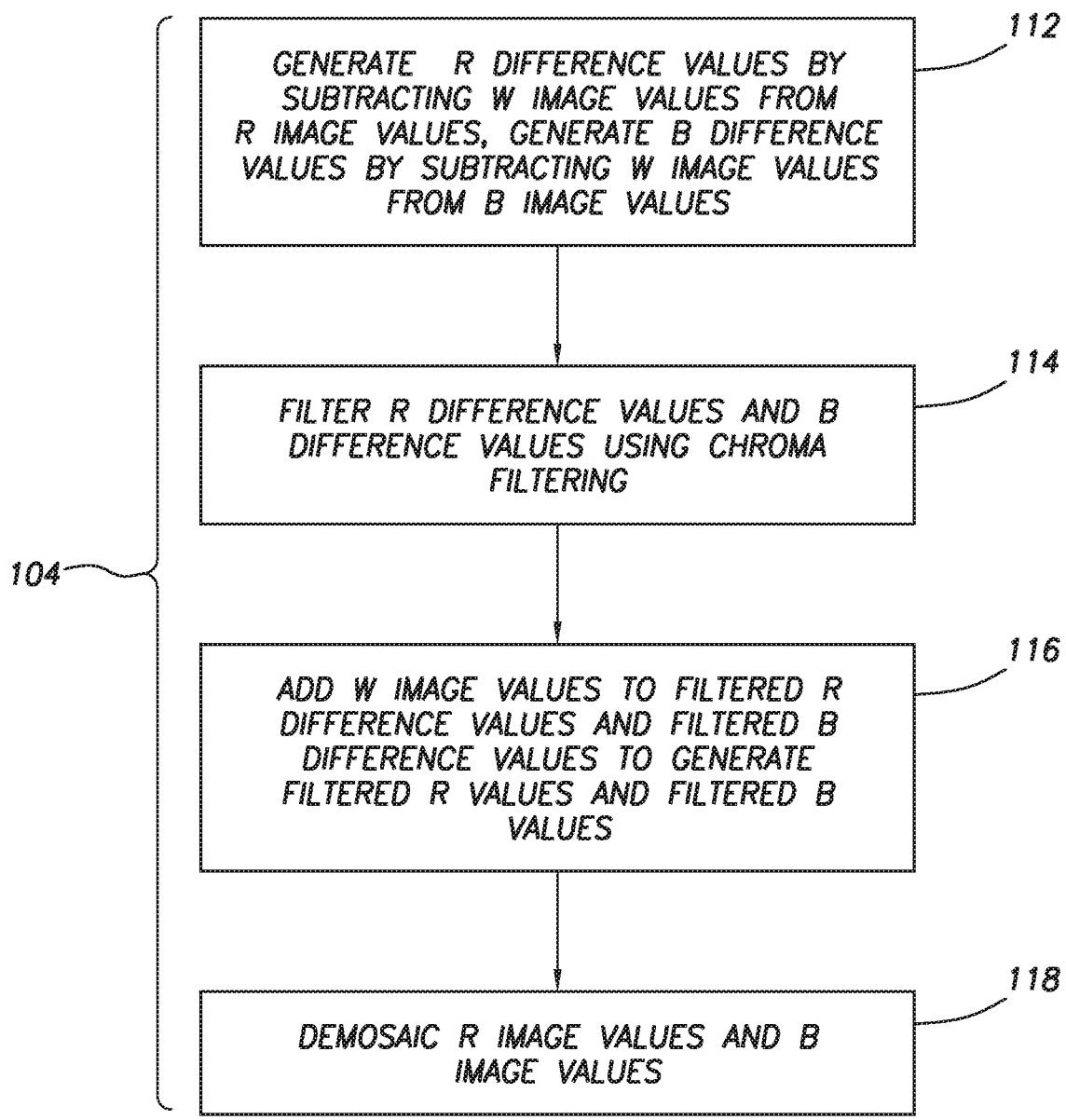
FIG. 7 is a flow chart of illustrative steps that may be performed by processing circuitry in an imaging system to demosaic and filter image signals received from a filtered pixel array in accordance with an embodiment.

FIG. 7 shows a flow chart of illustrative steps that may be performed by processing circuitry 16 to demosaic and filter image signals received from image sensors 212 and 214 of FIG. 2. The steps of FIG. 7 may, for example, be performed by processing circuitry 16 to perform chroma demosaicking on red and blue image data gathered by image pixels 32 to generate sufficient noise correlation in red, broadband, and blue image data. The steps of FIG. 7 may, for example, be performed as part of step 104 of FIG. 6.

At step 112, processing circuitry 16 may generate red difference values by subtracting the broadband image values from the red image values for each pixel. Processing circuitry 16 may generate blue difference values by subtracting the broadband image values from the blue image values. The red difference values may, for example, be computed for each red image pixel and the blue difference values may be computed for each blue image pixel of image pixel array 30.

At step 114, processing circuitry 16 may filter the red difference values and the blue difference values using a chroma filter. The chroma filter may be applied to the red and blue difference values by, for example, performing a weighted average of difference values computed over a kernel of image pixels 32 (e.g., a weighted average of a group of difference values that were computed by performing step 112). The kernel of image pixels may be defined as a subset of the image pixels in image pixel array 30 over which the chroma filtering is being performed (e.g., the kernel may include some or all of the image pixels in image pixel array 30). For example, when a 5 pixel by 5 pixel kernel is used, a weighted average of difference values is calculated for a 5 pixel by 5 pixel subset of image pixels 32 in image pixel array 30 when performing chroma filtering (e.g., a weighted sum of difference values may be computed for a given image pixel 32 using difference values at 25 surrounding image pixels in image pixel array 30). In general, a kernel of any desired size may be used.

At step 116, the broadband image values may be added to the chroma filtered red difference values and the chroma filtered blue difference values to generate chroma filtered red image values and chroma filtered blue image values, respectively.

At step 118, processing circuitry 16 may demosaic the chroma filtered red image values and the chroma filtered blue image values to produce red image data and blue image data (e.g., red and blue image data that has been chroma demosaicked) with increased correlated noise. The demosaicked white image data and the chroma demosaicked red and blue image data may then be operated on using the CCM to generate standard red, standard green, and standard blue (sRGB) image data as described above in connection with step 106 of FIG. 6.

FIG. 7 is merely illustrative. If desired, processing circuitry 16 may demosaic the chroma filtered red and blue image values prior to generating the red and blue difference values (e.g., processing circuitry 16 may perform step 118 prior to step 112).

If chroma filtering of the difference values is performed over a sufficiently large kernel of image pixels 32, minimal noise from the red and blue image data may remain in the red and blue difference values after chroma filtering (e.g., after performing step 114). For example, if the kernel has a size of 15 pixels by 15 pixels or greater, chroma filtering may reduce noise in the red and blue chroma filtered difference values to negligible levels. If desired, the kernel of image pixels 32 may include image pixels located in multiple image pixel arrays 30, image pixels located in multiple image sensors 36 and/or image pixels used during multiple time frames (e.g., to allow for temporal denoising). When the broadband image values are added to the chroma filtered difference values, noise in the white image values may dominate over noise in the difference values. In this way, noise in the red and blue image data produced at step 116 may be substantially equal to noise in the broadband image data. Noise in the red and blue image data may thereby be highly correlated, resulting in reduced noise amplification by the CCM. This process may produce less noise amplification by the CCM than when a Bayer pattern is used for image pixel array 30.

The CCM may operate on the red, broadband, and blue image data to produce linear sRGB data at step 106 (FIG. 6). For example, the CCM may extract information from the white image data to generate the standard green data. The broadband image data (e.g., the broadband image data collected by monochrome image sensor 214) may be preserved after operating on the image data with the CCM. The sRGB image data may be represented in other three-dimensional spaces such as a luminance-chroma-hue (LCH) space. In an LCH space, the luminance channel (L) may be related to the brightness of an image captured by image sensor 36, the chroma channel (C) may be related to the color saturation of an image, and the hue channel may be related to the specific color of the image (e.g., red, purple, yellow, green, etc.). The perception of noise and sharpness in a displayed image may be affected by noise and signal variations in the luminance channel. The SNR in the image data may be improved by transforming the sRGB data to LHC data, replacing a luminance value in the luminance channel with a white image value (which correlates well with overall image brightness due to the broad spectrum of the white image signal), and transforming LHC data back to sRGB data. In this way, noise amplification caused by the CCM may be suppressed in the luminance channel, where noise is particularly noticeable to a viewer when viewing a displayed image.

As described above in connection with optional step 108 of FIG. 6, a point filter may be applied to the linear sRGB data to produce corrected sRGB data using the white image data. The point filter may operate on a single image pixel 190 without information from adjacent image pixels 32, whereas chroma demosaicking may require image signals (e.g., difference values) from multiple image pixels (e.g., a kernel of image pixels) when being applied to image signals at a single image pixel 32. For example, the point filter may operate on a standard red value, standard green value, and standard blue value for each image pixel. To perform point filter operations on the sRGB data, processing circuitry 16 may use the red image data, white image data, and blue image data (e.g., the image data prior to applying the CCM) to compute an original (raw) luminance signal. The original luminance signal may be a linear combination (e.g., a weighted sum) of the white image data, red image data, and blue image data. If desired, the white image data may be weighted more heavily than the red and blue image data in the linear combination. Processing circuitry 16 may compute an implied luminance signal that is a linear combination of the standard red, standard green, and standard blue image data (e.g., after applying the CCM to the image data). If desired, weights in the linear combination used to compute the implied luminance signal may be substantially similar to the weights used to compute the original luminance signal. The weights may be adjusted to modify the "strength" of the point filter (e.g., the degree to which the point filter transforms or corrects the sRGB data).

Processing circuitry 16 may generate a scaling value (e.g., a scaling factor to be applied to color corrected image values) by, in a simplest case, dividing the original luminance signal by the implied luminance signal. If desired, the scaling factor may include a numerator and denominator. The numerator and/or the denominator of the scaling value may include a weighted sum of the original luminance signal and the implied luminance signal. The scaling value may include adjustable weighting parameters that can be varied to adjust the strength of the point filter (e.g., the weighting parameters may be continuously varied to adjust the strength of the point filter from zero to a full strength). To apply the point filter to the sRGB data (e.g., to the standard red, green, and blue image data), processing circuitry 16 may multiply the sRGB data by the scaling value to produce the corrected sRGB data. For example, processing circuitry 16 may multiply the standard red image data by the scaling value, the standard green image data by the scaling value, etc. If desired, the corrected sRGB data may have hue and chroma channels that are approximately preserved from before applying the point filter (e.g., upon conversion of the corrected sRGB data to LCH space). The corrected sRGB data may have improved noise and/or sharpness due to inherited fidelity of the broadband image signals.

Figure 8:
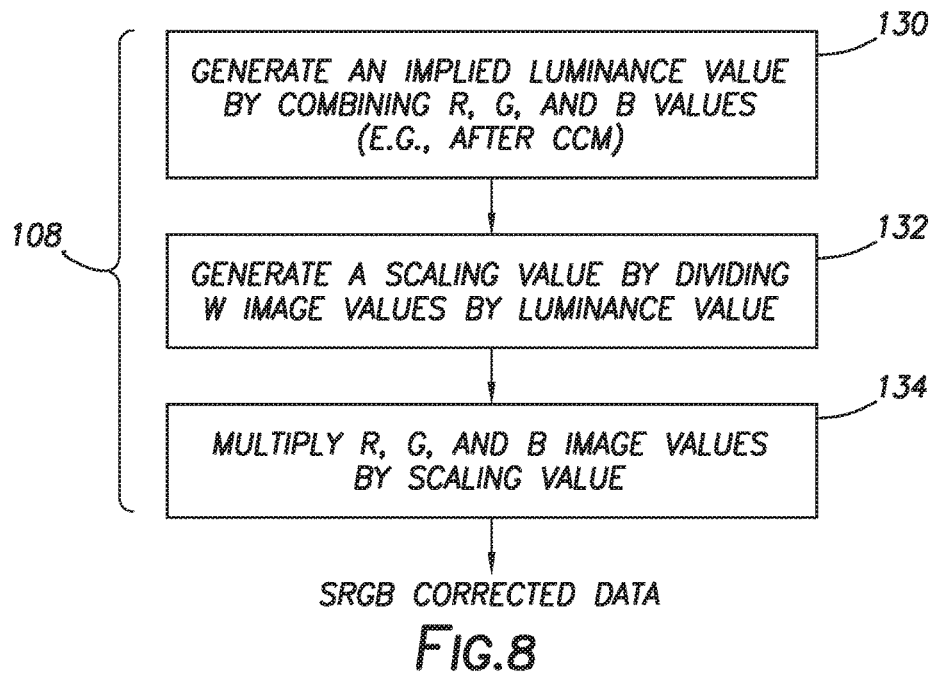
FIG. 8 is a flow chart of illustrative steps that may be performed by processing circuitry in an imaging system to apply a point filter to image signals received from a filtered pixel array in accordance with an embodiment.

In a simplest case, the original luminance signal may be approximated by the broadband image data. FIG. 8 shows a flow chart of illustrative steps that may be performed by processing circuitry 16 to apply a point filter (in the simplest case) to sRGB data after applying the CCM to the red, broadband, and blue image data (as an example). Processing circuitry 16 may, for example, apply the point filter to sRGB data for each image pixel 32 in image pixel array 30. The steps of FIG. 8 may, for example, be performed as part of step 108 of FIG. 6.

At step 130, processing circuitry 16 may generate an implied luminance value (e.g., a luminance value in LCH space) for a given image pixel 32 by combining the red, green, blue image data (e.g., after applying a CCM). The implied luminance value may, for example, be computed as a linear combination of the red, green, and blue image data.

At step 132, processing circuitry 16 may generate a scaling value by dividing the white image values by the implied luminance value. If desired, the scaling factor may be generated by dividing the broadband image values by a weighted sum of the implied luminance value and the broadband image value. The scaling factor may include adjustable weighting parameters that can be varied to adjust the strength of the point filter (e.g., the weighting parameters may be varied continuously to adjust the strength of the point filter from zero to a full strength). The scaling value may, for example, be an operator that operates on the sRGB data.

At step 134, processing circuitry 16 may multiply the sRGB data by the scaling value to produce corrected sRGB data (e.g., corrected standard red, green, and blue image data). For example, host processing circuitry 24 may multiply the standard red image data by the scaling value, the standard green image data by the scaling value, etc. The corrected sRGB data may, if desired be provided to an image display. The corrected sRGB data may have improved noise and/or sharpness when compared with the sRGB data prior to applying the point filter.

The examples of FIGS. 6-8 are merely illustrative. Any desired color filters may be used in conjunction with the white color filters shown for obtaining color image signals. Any combination of desired color filters may be used (e.g., any combination of red filters, green filters, cyan filters, infrared filters, ultraviolet filters, blue filters, yellow filters, magenta filters, purple filters, etc.). If desired, any other suitable three-dimensional spaces may be used for performing the point filter operation. While the above operations are described with respect to processing circuitry 16, some or all of the steps of FIGS. 6-8 may be performed by other processing circuitry such as host processor 24 of FIG. 1.

Figure 9:
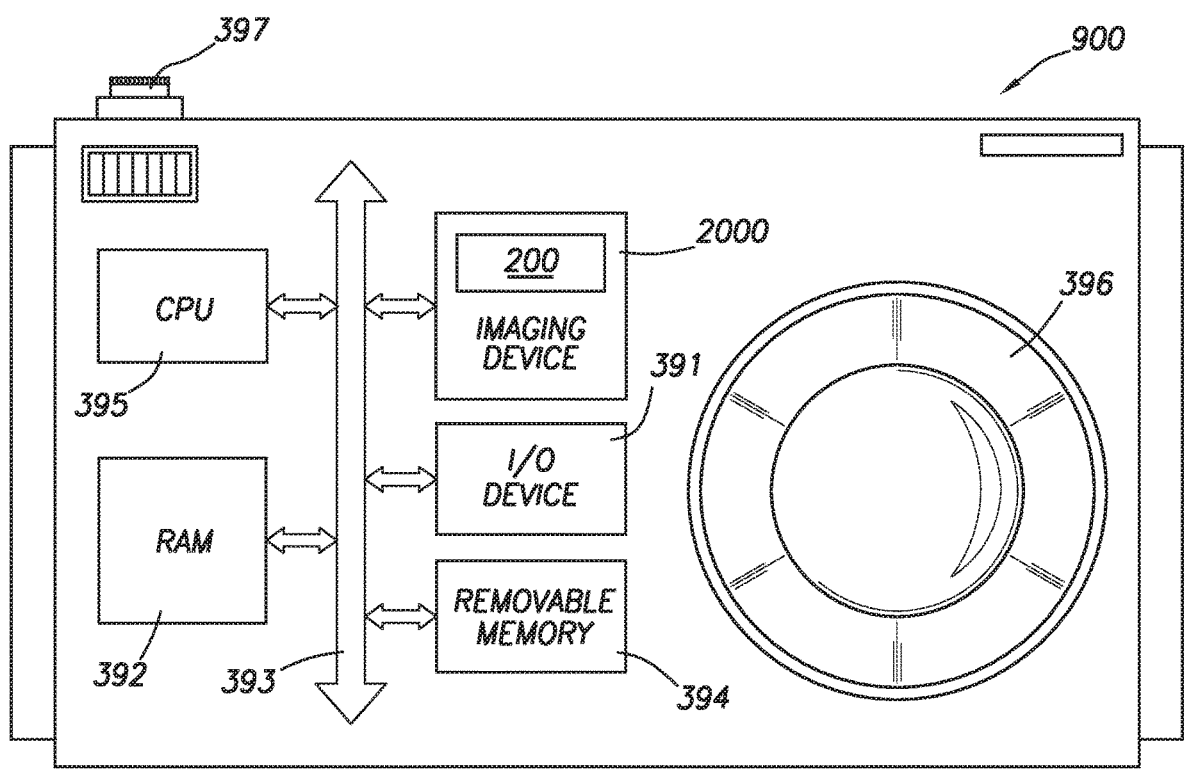
FIG. 9 is a block diagram of a processor system employing the embodiment of FIG. 1 in accordance with an embodiment.

FIG. 9 shows in simplified form a typical processor system 900, such as a digital camera, which includes an imaging device 200 (e.g., an imaging device 200 such as imaging sensor 36 of FIGS. 1-8 employing clear color filters and the techniques for operations described above). The processor system 900 is exemplary of a system having digital circuits that could include imaging device 200. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

The processor system 900 generally includes a lens 396 for focusing an image on pixel array 900 of device 200 when a shutter release button 397 is pressed, central processing unit (CPU) 395, such as a microprocessor which controls camera and one or more image flow functions, which communicates with one or more input/output (I/O) devices 391 over a bus 393. Imaging device 200 also communicates with the CPU 395 over bus 393. The system 900 also includes random access memory (RAM) 392 and can include removable memory 394, such as flash memory, which also communicates with CPU 395 over the bus 393. Imaging device 200 may be combined with the CPU, with or without memory storage on a single integrated circuit or on a different chip. Although bus 393 is illustrated as a single bus, it may be one or more busses or bridges or other communication paths used to interconnect the system components.

A camera module having both a monochrome image sensor and a di-chromatic image sensor may allow, for example, for the production of high-resolution monochrome images with high signal-to-noise ratios for certain operations (e.g., automotive applications, where there is little margin for error, or security applications), while also allowing for the production of color images when desired. While these color images are lower resolution and have higher signal-to-noise ratios as compared to the monochrome images, image data from the monochrome image sensor (e.g., broadband image data) may be used to reduce noise in the color images through the use of point filters and chroma demosaicking. A beam splitter may direct some light to the monochrome image sensor and other light to the di-chromatic image sensor, allowing for switching between monochrome and color images. Having one image sensor as a dedicated monochrome image sensor allows for high-resolution monochrome images to be outputted by the camera when desired. These high-resolution monochrome images provide enhanced luminance detail when compared with a single image sensor that combines broadband pixels and chromatic pixels.

Various embodiments have been described illustrating image sensors having both monochrome image sensors and chroma image sensors. Various image processing techniques (e.g., chroma demosaicking, applying a point filter, etc.) have also been described for reducing noise in image signals produced by the image signals.

In various embodiments, an imaging system may generate images in response to light. The imaging system may include a bi-chromatic image sensor and a monochrome image sensor. A beam splitter may direct a first portion of the light to the bi-chromatic image sensor and a second portion of the light to the monochrome image sensor. The beam splitter may be configured to direct at least half of the light toward the monochrome image sensor. In some embodiments, the beam splitter may pass light with a first polarization to the bi-chromatic image sensor and light with a second polarization to the monochrome image sensor.

The bi-chromatic image sensor may have an array of image sensor pixels with a first group of image sensor pixels configured to generate first image signals in response to light of a first color (e.g., red pixels) and a second group of image sensor pixels configured to generate second image signals in response to light of a second color (e.g., blue pixels). The monochrome image sensor may have an array of image sensor pixels with broadband image sensor pixels configured to generate third image signals. The third image signals may have a wider spectral response than the first image signals and may have a wider spectral response than the second image signals. In particular, the third image signals may have a wider spectral response than a sum of the spectral response of the first and second image signals.

In accordance with an embodiment, the imaging system may be a camera module having a lens that focuses light incident on camera module. The bi-chromatic image sensor may receive a first portion of the focused light, and the monochrome image sensor may receive a second portion of the focused light (e.g., the first and second portions of the light may be split using a beam splitter). The bi-chromatic image sensor may include a first group of image sensor pixels configured to generate first image signals in response to light of a first color and a second group of image sensor pixels configured to generate second image signals in response to light of a second color. The first and second group of image sensor pixels may be red, blue, or green image pixels. The monochrome image sensor may include image sensor pixels configured to generate third image signals in response to light of a third color. The monochrome image sensor pixels may be broadband image sensor pixels.

In various embodiments, the imaging system may also include processing circuitry configured to perform filtering operations on the first image signals, the second image signals, and the third image signals that increase noise correlations associated with first image signals, the second image signals, and the third image signals. The filtering operations may increase and decrease noise fluctuations in the first, second, and third image signals together in a correlated manner. The processing circuitry may select either a monochrome image or a color image for the imaging system output. In response to selecting a color image, the processing circuitry may perform the filtering operations on the first, second, and third image signals. In response to selecting a monochrome image, the processing circuitry may be configured to output an image based on the third image signals.

If a color image is selected as output, the processing circuitry may apply a color correction matrix to the third image signal and extract a fourth image signal from the third image signal. The processing circuitry may combine the first image signals, the second image signals, and the fourth image signals to generate a derived luminance value, and may compute an estimated luminance value based on the first image signals, the second image signals, and the third image signals. The processing circuitry may then modify the first image signals, the second image signals, and the fourth image signals using the derived luminance value and the estimated luminance value. Moreover, the processing circuitry may compute a scaling value based on the derived luminance value and the estimated luminance value, and modify the first image signals, the second image signals, and the fourth image signals by multiplying the first image signals, the second image signals, and the fourth image signals by the generated scaling value to produce the color image.

The foregoing is merely illustrative and various modifications can be made to the described embodiments. The foregoing embodiments may be implemented individually or in any combination.

What is claimed is:

1. An imaging system configured to generate images in response to light, comprising:
   a bi-chromatic image sensor having a first array of image sensor pixels, the first array of image sensor pixels comprising a first group of image sensor pixels configured to generate first image signals in response to light of a first color and a second group of image sensor pixels configured to generate second image signals in response to light of a second color;
   a monochrome image sensor having a second array of image sensor pixels, the second array of image sensor pixels comprising a third group of image sensor pixels configured to generate third image signals;
   a beam splitter that directs a first portion of the light to the bi-chromatic image sensor and a second portion of the light to the monochrome image sensor; and
   processing circuitry configured to demosaic the first, second, and third image signals.

2. The imaging system defined in claim 1, wherein the third group of image sensor pixels comprises broadband image sensor pixels and wherein the third image signals have a wider spectral response than the first image signals.

3. The imaging system defined in claim 2 wherein the third image signals have a wider spectral response than the second image signals.

4. The imaging system defined in claim 2 wherein the third image signals have a wider spectral response than a sum of the spectral responses of the first and second image signals.

5. The imaging system defined in claim 2, wherein the first group of image sensor pixels comprises red pixels and the second group of image sensor pixels comprises blue pixels.

6. The imaging system defined in claim 1 wherein the beam splitter is configured to direct at least half of the light toward the monochrome image sensor.

7. The imaging system defined in claim 1 wherein the beam splitter is configured to pass light with a first polarization to the bi-chromatic image sensor and light with a second polarization to the monochrome image sensor.

8. A camera module configured to generate images in response to light, the camera module comprising:
   a bi-chromatic image sensor having a first array of image sensor pixels, wherein the first array of image sensor pixels includes a first group of image sensor pixels configured to generate first image signals in response to light of a first color and a second group of image sensor pixels configured to generate second image signals in response to light of a second color;
   a monochrome image sensor having a second array of image sensor pixels, wherein the second array of image sensor pixels includes image sensor pixels configured to generate third image signals in response to light of a third color;
   a lens that focuses the light, wherein the bi-chromatic image sensor is configured to receive a first portion of the focused light and the monochrome image sensor is configured to receive a second portion of the focused light; and
   processing circuitry configured to output color images using a combination of the first, second, and third image signals and configured to output monochrome images using the third image signals.

9. The camera module defined in claim 8, wherein the image sensor pixels in the second array are broadband image sensor pixels and the first and second groups of image sensor pixels are selected from the group of image sensor pixels consisting of: red image sensor pixels, blue image sensor image pixels, and green image sensor image pixels.

10. The camera module defined in claim 8, further comprising:
    a beam splitter that directs the first portion of the focused light to the bi-chromatic image sensor and the second portion of the focused light to the monochrome image sensor.

11. An imaging system configured to generate images in response to light, the imaging system comprising:
    a bi-chromatic image sensor having a first group of image sensor pixels configured to generate first image signals in response to light of a first color and a second group of image sensor pixels configured to generate second image signals in response to light of a second color that is different from the first color;

a monochrome image sensor having a group of broadband image sensor pixels, wherein the group of broadband image sensor pixels is configured to generate third image signals in response to light of a third color; and processing circuitry configured to perform filtering operations on the first image signals, the second image signals, and the third image signals that increase noise correlations associated with first image signals, the second image signals, and the third image signals, wherein the processing circuitry is configured to:
- select a given one of a monochrome image and a color image for outputting,
- perform the filtering operations on the first, second, and third image signals in response to selecting the color image for outputting, and
- output an image based on the third image signals in response to selecting the monochrome image for outputting.

12. The imaging system defined in claim 11, wherein the filtering operations are configured to increase and decrease noise fluctuations in the first, second, and third image signals together in a correlated manner.

13. The imaging system defined in claim 11, wherein the processing circuitry is configured to apply a color correction matrix to the third image signal in response to selecting a color image for outputting, wherein the color correction matrix is configured to extract a fourth image signal from the third image signal.

14. The imaging system defined in claim 13, wherein the processing circuitry is configured to combine the first image signals, the second image signals, and the fourth image signals to generate a derived luminance value, the processing circuitry is configured to compute an estimated luminance value based on the first image signals, the second image signals, and the third image signals, and the processing circuitry is configured to modify the first image signals, the second image signals, and the fourth image signals using the derived luminance value and the estimated luminance value.

15. The imaging system defined in claim 14, wherein the processing circuitry is configured to compute a scaling value based on the derived luminance value and the estimated luminance value, and the processing circuitry is configured to modify the first image signals, the second image signals, and the fourth image signals by multiplying the first image signals, the second image signals, and the fourth image signals by the generated scaling value.

16. The imaging system defined in claim 11, wherein the first image signals have a first spectral response width, wherein the second image signals have a second spectral response width, and wherein the third image signals have a third spectral response width that is greater than the first spectral response width and that is greater than the second spectral response width.

17. The imaging system defined in claim 16, wherein the third spectral response width of the third image signals is greater than 75 percent of a sum of the first and second spectral response widths.

* * * * *